United States Patent [19]

Eckel Thomas et al.

[11] Patent Number: 5,126,404

[45] Date of Patent: * Jun. 30, 1992

[54] POLYCARBONATE MOLDING COMPOSITIONS

[75] Inventors: Eckel Thomas, Dormagen; Dieter Wittmann; Christian Lindner, both of Cologne; Uwe Westeppe, Mettmann, all of Fed. Rep. of Germany

[73] Assignee: Bayer Aktiengesellschaft, Leverkusen, Fed. Rep. of Germany

[*] Notice: The portion of the term of this patent subsequent to Apr. 14, 2009 has been disclaimed.

[21] Appl. No.: 517,084

[22] Filed: May 1, 1990

[30] Foreign Application Priority Data

May 6, 1989 [DE] Fed. Rep. of Germany ....... 3914946

[51] Int. Cl.$^5$ .................... C08L 69/00; C08L 51/04
[52] U.S. Cl. ..................................... 525/67; 525/64
[58] Field of Search .................. 525/67; 528/196, 204

[56] References Cited

U.S. PATENT DOCUMENTS

| | | | |
|---|---|---|---|
| 3,398,212 | 8/1968 | Jackson, Jr. et al. | 260/860 |
| 4,469,833 | 9/1984 | Mark | 524/161 |
| 4,839,426 | 6/1989 | Gallucci | 525/146 |
| 4,937,285 | 6/1990 | Wittmann | 525/67 |
| 4,982,014 | 1/1991 | Freitag | 528/196 |

*Primary Examiner*—Ana L. Carillo
*Assistant Examiner*—David Buttner
*Attorney, Agent, or Firm*—Joseph C. Gil; Richard E. L. Henderson

[57] ABSTRACT

Thermoplastic molding composition comprising

A. 5 to 99% by weight (based on A+B) of a polycarbonate based on substituted dihydroxydiphenyl cycloalkanes B. 1 to 95% by weight (based on A+B) of a graft polymer prepared by a special process of
  5 to 90 parts by weight of a mixture of
    B.1.1. 50 to 95 parts by weight styrene, α-methyl styrene, $C_{1-4}$ alkyl- or halogen-nucleus-substituted styrenes, $C_{1-8}$ alkyl methacrylates, $C_{1-8}$ alkyl acrylates or mixtures thereof and
    B.1.2. 5 to 50 parts by weight acrylonitrile, methacrylonitrile, $C_{1-8}$ alkyl methacrylates, $C_{1-8}$ alkyl acrylates, maleic anhydride, $C_{1-4}$ alkyl-N-maleic imides, phenyl-N-maleic imides or mixtures thereof on
  B.2. 10 to 95 parts by weight of a diene rubber having an average particle diameter d50 of from 0.09 to 1 μm and a gel content of more than 50% by weight and optionally at least one other thermoplastic resin which replaces up to 75% by weight of the polycarbonate A.

8 Claims, No Drawings

POLYCARBONATE MOLDING COMPOSITIONS

FIELD OF THE INVENTION

This invention relates to thermoplastic molding compositions and especially to compositions containing a polycarbonate resin derived from a substituted dihydroxydiphenyl cycloalkane.

SUMMARY OF THE INVENTION

The invention is directed to a thermoplastic molding composition comprising
A. 5 to 99% by weight of a polycarbonate based on substituted dihydroxydiphenyl cycloalkanes,
B. 1 to 95% by weight of a graft polymer of
  B.1. 5 to 90 parts by weight of a mixture of
    B.1.1. 50 to 95 parts by weight of at least one member selected from the group consisting of styrene, α-methyl styrene, $C_{1-4}$ alkyl- or halogen-nucleus-substituted styrenes, $C_{1-8}$ alkyl methacrylates, $C_{1-8}$ alkyl acrylates or mixtures thereof and
    B.1.2. 5 to 50 parts by weight of at least one member selected from the group consisting of acrylonitrile, methacrylonitrile, $C_{1-8}$ alkyl methacrylates, $C_{1-8}$ alkyl acrylates, maleic anhydride, $C_{1-4}$ alkyl-N-maleic imides, phenyl-N-maleic imides or mixtures thereof on
  B.2. 10 to 95 parts by weight of a diene rubber having an average particle diameter $d_{50}$ of from 0.09 to 1 μm and a gel content of more than 50% by weight, an initiator system of an organic hydroperoxide and ascorbic acid being used for the graft polymerization, and optionally
C. at least one other thermoplastic resin which replaces up to 75% by weight of the polycarbonate A.

DETAILED DESCRIPTION OF THE INVENTION

This invention relates to a thermoplastic molding composition containing
A. 5 to 99% by weight, preferably 40 to 98% by weight and more preferably 60 to 97% by weight (based on A+B) of a polycarbonate based on substituted dihydroxydiphenyl cycloalkanes,
B. 1 to 95% by weight, preferably 2 to 60% by weight and more preferably 3 to 40% by weight (based on A+B) of a graft polymer of
  B.1. 5 to 90 parts by weight and preferably 20 to 80 parts by weight of a mixture of
    B.1.1. 50 to 95 parts by weight, preferably 60 to 95 parts by weight styrene, α-methyl styrene, $C_{1-4}$ alkyl- or halogen-nucleus-substituted styrenes, $C_{1-8}$ alkyl methacrylates, $C_{1-8}$ alkyl acrylates or mixtures thereof and
    B.1.2. 5 to 50 parts by weight and preferably 5 to 40 parts by weight acrylonitrile, methacrylonitrile, $C_{1-8}$ alkyl methacrylates, $C_{1-8}$ alkyl acrylates, maleic anhydride, $C_{1-4}$ alkyl-N-maleic imides, phenyl-N-maleic imides or mixtures thereof on
  B.2. 10 to 95 parts by weight and preferably 20 to 80 parts by weight of a diene rubber having an average particle diameter $d_{50}$ of from 0.09 to 1 μm and preferably from 0.09 to 0.6 μm and a gel content of more than 50% by weight, preferably more than 70% by weight and, more preferably, in the range from 73 to 98% by weight, an initiator system of an organic hydroperoxide and ascorbic acid being used for the graft polymerization, and optionally
C. at least one other thermoplastic resin which replaces up to 75% by weight and preferably up to 50% by weight of the polycarbonate A.

The moulding compositions according to the invention have a high heat distortion temperature and simultaneously excellent notched impact strength and improved stress-strain behaviour.

POLYCARBONATES A

Polycarbonates A are high molecular weight, thermoplastic, aromatic polycarbonates having molecular weights Mw (weight average) of at least 10,000 and preferably in the range from 20,000 to 300,000 which contain bifunctional structural units corresponding to formula (I)

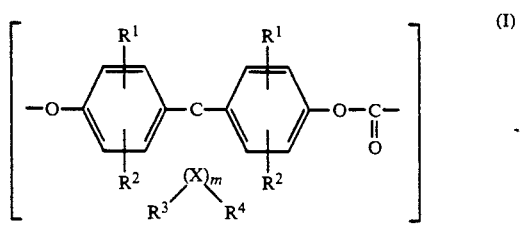

in which
$R^1$ and $R^2$ independently of one another represent hydrogen, halogen, preferably chlorine or bromine, $C_{1-8}$ alkyl, $C_5$-$C_6$ cycloalkyl, $C_{6-10}$ aryl, preferably phenyl, and $C_{7-12}$ aralkyl, preferably phenyl-$C_{1-4}$-alkyl, more especially benzyl,
m is an integer of 4 to 7 and preferably 4 or 5,
$R^3$ and $R^4$ may be selected individually for each X and independently of one another represent hydrogen or $C_1$-$C_6$ alkyl and
X represents carbon, with the proviso that, for at least one atom X, $R^3$ and $R^4$ are both alkyl.

Starting products for the polycarbonates A are dihydroxydiphenyl cycloalkanes corresponding to formula (II)

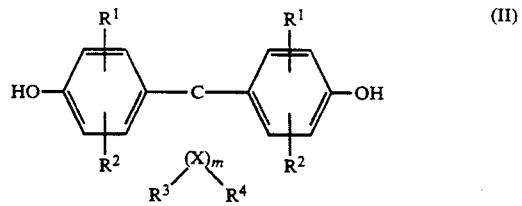

in which X, $R^1$, $R^2$, $R^3$, $R^4$ and m are as defined for formula (I).

Preferably at 1 to 2 atoms X and, more particularly, at only one atom X, both $R^3$ and $R^4$ are alkyl. The preferred alkyl radical is methyl. The X atoms in the α-position to the diphenyl-substituted C atom (C-1) are preferably not dialkyl-substituted, whereas the X atoms in the β-position to C-1 are preferably dialkyl-substituted.

Preferred dihydroxydiphenyl cycloalkanes are those containing 5 and 6 ring C atoms in the cycloaliphatic radical (m=4 or 5 in formula (II)), for example diphenols corresponding to formulae (IIa) to (IIc):

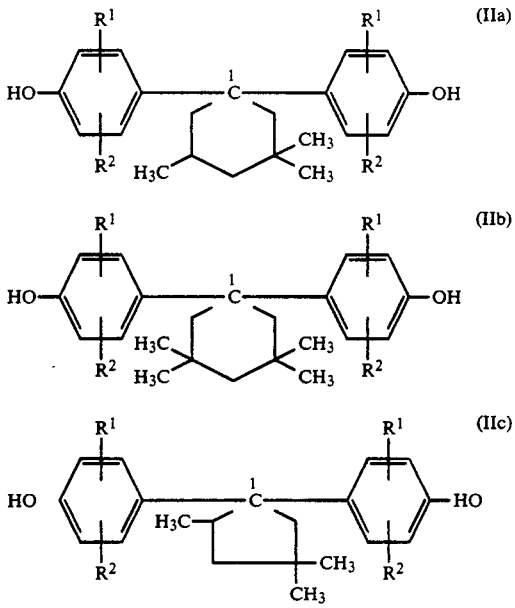

the 1,1-bis-(4-hydroxyphenyl)-3,3,5-trimethyl cyclohexane (formula IIa) with $R^1$ and $R^2 = H$ being particularly preferred.

The polycarbonates A and the dihydroxydiphenyl cycloalkanes corresponding to formula (II) and their production are described in German Patent Application P 38 32 396.6.

It is possible to use either a diphenol corresponding to formula (II) in which case homopolycarbonates are formed, or several diphenols corresponding to formula (II), in which case copolycarbonates are formed.

The diphenols corresponding to formula (II) may also be used in admixture with other diphenols, for example with those corresponding to formula (III)

for the production of polycarbonates A.

In formula (III), Z is a difunctional, mononuclear or polynuclear aromatic radical containing 6 to 30 carbon atoms; the two OH groups are directly attached to C atoms of an aromatic ring.

Particularly preferred diphenols correspond to formula (X)

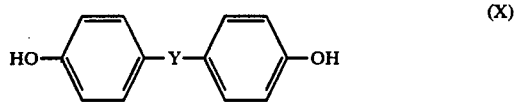

in which Y is a single bond, a $C_{1-7}$ alkylene or alkylidene radical, a $C_{5-12}$ cycloalkylene or cycloalkylidene radical,

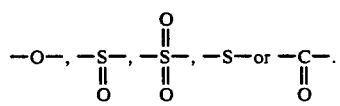

Nucleus-alkylated and nucleus-halogenated derivatives of the diphenols corresponding to formula (X) are also preferred.

Examples of diphenols corresponding to formula (III) are hydroquinone, resorcinol, dihydroxydiphenyls, bishydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl) diisopropylbenzenes and nucleus-alkylated and nucleus-halogenated compounds thereof.

These and other suitable other diphenols are described, for example, in U.S. Pat. Nos. 3,028,365, 2,999,835, 3,148,172, 3,275,601, 2,991,273, 3,271,367, 3,062,781, 2,970,131 and 2,999,846; in DE-OS 1 570 703, 2 063 050, 2 063 052, 2 211 0956, in FR-PS 1 561 518 and in the book by H. Schnell entitled "Chemistry and Physics of Polycarbonates", Interscience Publishers, New York, 1964 all of which are incorporated herein by reference.

Preferred other diphenols are, for example, 4,4'-dihydroxydiphenyl, 2,2-bis-(4-hydroxyphenyl)-propane, 2,4-bis-(4-hydroxyphenyl)-2-methylbutane, ,1-bis-(4-hydroxyphenyl)-cyclohexane, ,α'-bis-(4-hydroxyphenyl)-p-diisopropylbenzene, 2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl) -2-methyl-butane, 1,1-bis-(3,5-dimethyl-4-hydroxyphenyl)-cyclohexane, α,α'-bis-(3,5-dimethyl-4-hydroxyphenyl)-p-diisopropylbenzene, 2 2-bis- (3, 5-dichloro-4-hydroxyphenyl)-propane and 2,2-bis-(3,5-dibromo-4-hydroxyphenyl)-propane.

Particularly preferred diphenols corresponding to formula (III) are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

2, 2-Bis-(4-hydroxyphenyl)-propane is particularly preferred.

The other diphenols may be used either individually or in admixture with one another.

The molar ratio of diphenols corresponding to formula (II) to the other diphenols optionally used corresponding to formula (III) is 100:0 to 2:98, preferably 100:0 to 5:95, more preferably 100:0 to 10:90 and most preferably 100:0 to 20:80.

The various diphenols may be arranged statistically or in blocks in the polycarbonates A.

The polycarbonates may be branched in known manner. If branching is required, it may be achieved in known manner by co-condensation of small quantities, preferably of from 0.05 to 2.0 mol-% (based on diphenols used), of compounds having a functionality of three or more, particularly those containing three or more phenolic hydroxyl groups. Branching agents containing three or more phenolic hydroxyl groups include phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl)-propane, 2,2-bis-(4-hydroxyphenylisopropyl)-phenol, 2,6-bis-(2-hydroxy-5-methylbenzyl)-4-methylphenol, 2-(4-hydroxyphenyl)-2-(2,4-dihydroxyphenyl)-propane, hexa-(4-(4-hydroxyphenylisopropyl)- phenyl)-orthoterephthalic acid ester, tetra-(4-hydroxyphenyl)-methane, tetra-(4-(4-hydroxyphenylisopropyl)-phenoxy)-methane and 1,4-bis-((4',4"-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Monofunctional compounds may be used in the usual concentrations as chain terminators for regulating the molecular weight of the polycarbonates A in known manner. Suitable compounds are, for example, phenol, tert.-butylphenols or other alkyl-$C_1$-$C_7$-substituted phenols. Small quantities of phenols corresponding to formula (IV)

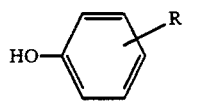

(IV)

in which R is a branched $C_8$ and/or $C_9$ alkyl radical, are particularly suitable for regulating molecular weight. In the alkyl radical R, the percentage of hydrogen atoms in $CH_3$ groups is between 47 and 89% and the percentage of hydrogen atoms in CH and $CH_2$ groups between 53 and 11%. R is preferably in the o- and/or p-position to the OH group, 20% being the particularly preferred upper limit to the ortho component. The chain terminators are generally used in quantities of from 0.5 to 10 mol-% and preferably in quantities of from 1.5 to 8 mol-%, based on the diphenols used.

The polycarbonates A may be produced in known manner, preferably by the interfacial process (cf. H. Schnell "Chemistry and Physics of Polycarbonates", Polymer Reviews, Vol. IX, pages 33 et Interscience Publ., 1964). In this process, the diphenols corresponding to formula (II) are dissolved in aqueous alkaline phase. To prepare copolycarbonates with other diphenols, mixtures of diphenols corresponding to formula (II) and the other diphenols, for example those corresponding to formula (III), are used. Chain terminators, for example corresponding to formula (IV), may be added to regulate molecular weight. The reaction is then carried out with phosgene by the interfacial condensation method in the presence of an inert, preferably polycarbonate-dissolving, organic phase. The reaction temperature is in the range from 0° to 40° C.

The branching agents optionally used may be initially introduced either with the diphenols in the aqueous alkaline phase or may be added in solution in the organic solvent before the phosgenation.

In addition to the diphenols of formula (II) and, optionally, other diphenols (III) mono- and/or bis-chlorocarbonic acid esters thereof may also be used, being added in solution in organic solvents. The quantity of chain terminators and branching agents used is then determined by the molar quantity of diphenolate residues corresponding to formula (II) and, optionally, formula (III). Where chlorocarbonic acid esters are used, the quantity of phosgene may be reduced accordingly in known manner.

Suitable organic solvents for the chain terminators and, optionally, for the branching agents and the chlorocarbonic acid esters are, for example, methylene chloride, chlorobenzene, acetone, acetonitrile and mixtures of these solvents, particularly mixtures of methylene chloride and chlorobenzene. The chain terminators and branching agents used may optionally be dissolved in the same solvent.

The organic phase for the interfacial polycondensation may be formed, for example, by methylene chloride, chlorobenzene and by mixtures of methylene chloride and chlorobenzene.

Aqueous NaOH solution for example is used as the aqueous alkaline phase.

The production of the polycarbonates A by the interfacial process may be catalyzed in the usual way by such catalysts as tertiary amines, particularly tertiary aliphatic amines, such as tributylamine or triethylamine. The catalysts may be used in quantities of from 0.05 to 10 mol % based on mols diphenols used. The catalysts may be added before the beginning of phosgenation or during or even after phosgenation.

The polycarbonates A may also be produced by the known homogenous-phase process, the so-called "pyridine process" and also by the known melt transesterification process using diphenyl carbonate for example instead of phosgene.

The polycarbonates A preferably have molecular weights Mw (weight average, as determined by gel chromatography after preliminary calibration) of at least 10,000 and, more preferably, in the range from 20,000 to 300,000 and, most preferably, in the range from 20,000 to 80,000. They may be linear or branched and are homopolycarbonates or copolycarbonates based on the diphenols corresponding to formula (II).

Polycarbonates combining high heat resistance with other favorable properties are obtained by incorporation of the diphenols corresponding to formula (II). This applies in particular to the polycarbonates based on the diphenols of formula (II), in which n=4 or 5, and more especially to the polycarbonates based on the diphenols (IIa), in which $R^1$ and $R^2$ independently of one another are as defined for formula (II) and, more particularly, represent hydrogen.

Accordingly, the particularly preferred polycarbonates A are those where m in the structural units of formula (I) is 4 or 5 and, more particularly, those of structural units corresponding to formula (V)

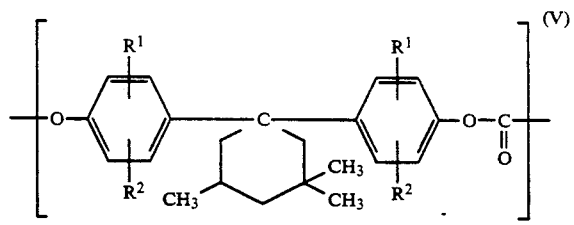

in which $R^1$ and $R^2$ are as defined for formula (I), but more preferably represent hydrogen.

These polycarbonates based on the diphenols corresponding to formula (IIa), in which in particular $R^1$ and $R^2$ are hydrogen, show not only high heat resistance, but also high UV stability and good melt flow behavior, which was not expected.

In addition, the properties of the polycarbonates may be modified by combination with other diphenols, particularly with those corresponding to formula (III).

GRAFT POLYMERS B

The graft polymers B according to the invention are produced by a special process disclosed in DE-OS 3 708

913, according to which graft polymers of resin-forming monomers on rubbers can be produced in high graft yields (so that they surprisingly contain very little free polymer of the graft monomers) providing polymerization is carried out in emulsion using an initiator system of an organic hydroperoxide and ascorbic acid.

The monomers (B.1) are preferably polymerized in aqueous emulsion in the presence of an emulsion of the rubber (B.2) at 40° to 70° C. and more especially at 50° to 70° C. using an initiator system of 0.3 to 1.5 parts by weight organic hydroperoxide (I) and 0.1 to 1 part by weight ascorbic acid (II) per 100 parts by weight graft monomers, the ratio by weight of (I) to (II) being from 0.3 to 15, more especially from 1 to 10 and preferably from 3 to 8.

Preferred diene rubbers are homopolymers of butadiene, isoprene, chloroprene and copolymers of these monomers with up to 40% by weight of other monomers, such as acrylonitrile, styrene, alkyl acrylate, alkyl methacrylate and, optionally, relatively small quantities of polyfunctional vinyl monomers, such as divinyl benzene and ethylene glycol bisacrylate.

The rubbers are at least partly crosslinked and have gel contents of more than 50% by weight and more especially from 73 to 98% by weight and are particulate with mean particle diameters (d50 values) of from 0.09 to 1.0 μm and more especially from 0.09 to 0.6 μm. Particulate rubbers such as these are known and are produced by emulsion polymerization, generally being present in the form of latices.

The graft polymers B according to the invention are those obtained by graft polymerization of 5 to 90 parts by weight and preferably 20 to 80 parts by weight of a vinyl monomers or mixture of vinyl monomers (B.1) onto 10 to 95 parts by weight and preferably 20 to 80 parts by weight diene rubber (B.2).

The particularly preferred vinyl monomer is methyl methacrylate. Preferred vinyl monomer mixtures consist of 50 to 95 parts by weight styrene, α-methyl styrene (or other alkyl- or halogen-nucleus-substituted styrenes) or methyl methacrylate on the one hand and 5 to 50 parts by weight acrylonitrile, methacrylonitrile, $C_{1-8}$ alkyl acrylates, $C_{1-8}$ alkyl methacrylates, maleic anhydride or N-substituted maleic imides on the other hand.

Preferred alkyl acrylates and alkyl methacrylates are butyl acrylate and methyl methacrylate.

Preferred monomers for the synthesis of the graft shell consist of styrene/acrylonitrile mixtures (ratio by weight 72:28) and of styrene/maleic anhydride mixtures (ratio by weight 94 to 87:6 to 13).

Particularly preferred monomer combinations for the synthesis of the graft shells are 30 to 40 parts by weight α-methyl styrene, 52 to 62 parts by weight methyl methacrylate and 4 to 14 parts by weight acrylonitrile.

The graft polymers B are prepared in aqueous emulsion by polymerization of the monomers onto a rubber present in aqueous emulsion. Surface-active additives, such as emulsifiers or dispersants, are normally used, optionally together with additives for establishing certain pH values and electrolyte contents during the graft polymerization. The emulsion graft polymerization may also be carried out in the absence of an emulsifier, for example if small quantities of monomer are used by comparison with the quantity of rubber or if the emulsifiers present in the rubber emulsion (latex) are themselves sufficient to guarantee the stability of the emulsion during the graft polymerization of the monomers.

Anionic emulsifiers, preferably alkali salts of fatty acids and of arylsulfonic acids, are particularly suitable. They are used in quantities of up to 5% by weight and preferably in quantities of up to 2.5% by weight, based on the monomers to be polymerized.

Suitable hydroperoxides are, for example, cumene hydroperoxide, tert.-butyl hydroperoxide, hydrogen peroxide, preferably cumene hydroperoxide and tert.-butyl hydroperoxide, i.e. hydroperoxides having long half lives.

According to DE-OS 3 708 913, polymerization may be carried out for example as follows:

The graft monomers and, optionally, emulsifier and also hydroperoxide and ascorbic acid (in the form of solutions) are added to an aqueous emulsion of a partially crosslinked diene rubber at polymerization temperatures in the range from 40° to 70° C. and more especially in the range from 50° to 70° C. Small quantities of heavy metal cations, particularly iron ions, may be added as a further component of the initiator system, particularly if the rubber emulsions already contain relatively large quantities of complexing agents. Normally, it is preferred not to use iron ions so that the graft polymers obtained are free from heavy metals. The process uses aqueous solutions of ascorbic acid and solutions of hydroperoxide. Hydroperoxides which are not sufficiently soluble in water, such as cumene hydroperoxide, are used in the form of aqueous emulsions (advantageously with the same emulsifier as in the graft polymerization).

The hydroperoxide and the ascorbic acid may be added continuously or in portions during the graft polymerization. Part of the hydroperoxide is preferably initially introduced with the rubber to be grafted. The graft monomers, the ascorbic acid, the remaining hydroperoxide and, optionally, emulsifier are added separately as the polymerization reaction progresses.

The quantities of hydroperoxide and ascorbic acid are critical. Overdoses of hydroperoxide or ascorbic acid or both result in a reduction in the graft yield and in the molecular weight of the polymer formed. In addition, underdoses or overdoses of hydroperoxide and ascorbic acid can also affect monomer conversion and emulsion stability to a considerable extent. Temperatures in the range from 40° to 70° C. are essential for the graft polymerization.

The graft polymerization may be continued to monomer conversions of more than 90% by weight and preferably more than 98% by weight and gives storable graft polymer emulsions having polymer contents of 25 to 50% by weight. The graft polymer may be isolated therefrom by known coagulation processes (for example with acids or salts).

If it is desired to combine the graft polymers with thermoplastic resins which are themselves present in the form of emulsions, the graft polymer emulsion may be mixed and co-coagulated with the resin emulsion.

THERMOPLASTIC RESIN C

Suitable thermoplastic resins C are, primarily,

C.1 vinyl copolymers
C.2 polyalkylene terephthalates
C.3 aromatic polycarbonates (apart from the polycarbonates A)
C.4 aromatic polyester carbonates
C.5 aromatic polyether sulfones These thermoplastic resins may replace up to 75% by weight and preferably up to 50% by weight of the polycarbonate A.

It is possible in accordance with the invention to use vinyl copolymers C.1 of 50 to 98% by weight and preferably 60 to 95% by weight methyl methacrylate, styrene, α-methyl styrene, nucleus-substituted styrene or mixtures thereof on the one hand and 50 to 2% by weight and preferably 40 to 5% by weight acrylonitrile, methacrylonitrile, methyl methacrylate, maleic anhydride, N-substituted maleic.imide on mixtures thereof on the other hand.

Thermoplastic copolymers C.1 may be formed as secondary products in the preparation of the graft polymers B, particularly where large quantities of monomers are graft polymerized onto small quantities of rubber. The secondary product of the graft polymerization is not included in the quantity of copolymer C.1 optionally added.

The vinyl copolymers C.1 are resin-like, thermoplastic and rubber-free.

Particularly preferred thermoplastic resins C.1 are copolymers of styrene, acrylonitrile and, optionally methyl methacrylate; copolymers of α-methyl styrene, acrylonitrile and, optionally, methyl methacrylate; as well as copolymers of styrene, α-methyl styrene, acrylonitrile and, optionally methyl methacrylate.

The styrene-acrylonitrile copolymers C.1 are known and may be prepared by radical emulsion, suspension, solution or bulk polymerization. The copolymers C.1 preferably have molecular weights (weight average, as determined by light scattering or sedimentation) in the range from 15,000 to 200,000.

Particularly preferred copolymers C.1 are statistical copolymers of styrene and maleic anhydride which have been produced from the corresponding monomers by continuous bulk or solution polymerization with incomplete conversions. Their preferred content of polymerized maleic anhydride is 5 to 25% by weight, their molecular weight (number average Mn) is preferably in the range from 60,000 to 200,000 and their intrinsic viscosity ($\eta$) is preferably in the range from 0.3 to 0.9 (as measured in dimethyl formamide at 25° C.; cf. Hoffmann, Krömer, Kuhn, Polymeranalytik I, Stuttgart 1977, pages 316 et seq.

Instead of styrene, the vinyl copolymers C.1 may also contain copolymerized nucleus-substituted styrenes, such as p-methyl styrene, vinyl toluene, 2,4-dimethyl styrene and other substituted styrenes, such as a-methyl styrenel Polyalkylene terephthalates C.2 are reaction products of terephthalic acid and, optionally, other dicarboxylic acids (or reactive derivatives thereof, for example dimethyl esters or anhydrides) and aliphatic, cycloaliphatic or aryl aliphatic diols, preferably aliphatic and cycloaliphatic diols containing 2 to 10 carbon atoms (Kunststoff-Handbuch, Vol. VIII, pages 695 et seq., Carl Hanser Verlag, München 1973).

Preferred polyalkylene terephthalates C.2 contain from 80 to 100 mol-% and preferably from 90 to 100 mol-%, based on dicarboxylic acid, of terephthalic acid residues and from 80 to 100 mol-% and preferably from 90 to 100 mol-%, based on diols, of ethanediol and/or 1,4-butanediol residues. In addition to terephthalic acid residues, the preferred polyalkylene terephthalates C.2 may contain from 0 to 20 mol-% residues of other aromatic dicarboxylic acids containing 8 to 14 carbon atoms or aliphatic dicarboxylic acids containing 4 to 12 carbon atoms, for example residues of phthalic acid, isophthalic acid, naphthalene-2,6-dicarboxylic acid, 4,4'-diphenyl dicarboxylic acid, succinic, adipic, sebacic, azelaic of cyclohexane diacetic acid. In addition to ethandiol and/or 1,4-butanediol residues, preferred polyalkylene terephthalates C.2 may contain from 0 to 20 mol-% residues of other aliphatic diols containing 3 to 12 carbon atoms or cycloaliphatic diols containing 6 to 12 carbon atoms, for example residues of 1,5-pentanediol, 1,6-hexanediol, 1,4-cyclohexane dimethanol, 3-methyl-1,3-and -1,6-pentanediol, 2-ethyl-1,3-hexanediol, 2,2-diethyl-1, 3-propanediol, 2,5-hexanediol, 1,4-di-(β-hydroxyethoxyphenyl)propane, 2,4-dihydroxy-1,1,3,3-tetramethylcyclobutane, 2,2-bis-(3-β-hydroxyethoxyphenyl)-propane and 2,2-bis -(4-hydroxypropoxyphenyl)-propane, cf. DE-05 2 407 647; 2 407 776; 2 715 932).

The polyalkylene terephthalates C.2 may be branched by incorporation of small quantities of trihydric or tetrahydric alcohols and tribasic or tetrabasic carboxylic acids (cf. DE-OS 1 900 270 and US-PS 3,692,744). Examples of branching agents are trimesic acid, trimellitic acid, trimethylol ethane and propane and pentaerythritol. It is advisable to use no more than 1 mol-% of the branching agent (based on dicarboxylic acids).

Polyalkylene terephthalates C.2 which have been prepared solely from terephthalic acid (or reactive derivatives thereof, for example dialkyl esters) and ethanol and/or 1,4-butanediol and mixtures thereof are particularly preferred.

Other preferred polyalkylene terephthalates C.2 are copolyesters prepared from at least two of the above mentioned diols. Particularly preferred copolyesters are poly-(ethanediol/1,4-butanediol) terephthalates. The residues of the various diols may be present in the copolyesters in blocks or in statistical distribution.

The polyalkylene terephthalates C.2 generally have an intrinsic viscosity of from 0.4 to 1.5 dl/g, preferably from 0.5 to 1.3 dl/g and more preferably from 0.6 to 1.2 dl/g, as measured in a mixture of phenol and o-dichlorobenzene (ratio by weight 1:1) at 25° C. and at a concentration of 0.5 g/dl.

Homopolycarbonates and copolycarbonates may be used as the aromatic polycarbonates C.3 U.S. Pat. No. 2,999,835, GB-PS 777,627 and DE-OS 3 334 872). Bisphenol A polycarbonates are particularly preferred.

Aromatic polyester carbonates C.4 are predominantly or exclusively synthesized from aromatic $C_{8-14}$ dicarboxylic acids, $C_{6-30}$ diphenols and carbonic acid derivatives, for example phosgene.

Preferred aromatic dicarboxylic acids are isophthalic acid, terephthalic acid, diphenyl ether-4,4'-dicarboxylic acid, naphthalene-2,6-dicarboxylic acid and mixtures of these acids. Isophthalic and terephthalic acid are particularly preferred. The preferred carbonic acid derivative is phosgene.

Preferred diphenols for the production of the aromatic polyester carbonates C.4 are compounds corresponding to formula (VI)

$$HO—Z—OH \qquad (VI)$$

in which Z is a difunctional, mononuclear or polynuclear aromatic radical containing 6 to 30 carbon atoms and the two OH groups are directly attached to carbon atoms of an aromatic ring.

Particularly preferred diphenols are compounds corresponding to formula (VII)

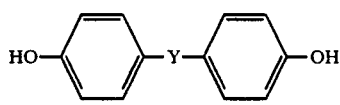 (VII)

in which Y is a single bond, a $C_{1-7}$ alkylene or alkylidene radical, a $C_{5-12}$ cycloalkylene or cycloalkylidene radical,

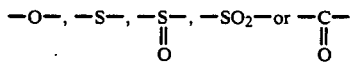

and nucleus-alkylated and nucleus-halogenated derivatives thereof, for example hydroquinone, resorcinol, dihydroxydiphenyls, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α'-bis-(hydroxyphenyl) -diisopropyl benzenes and also nucleus-alkylated and nucleus-halogenated derivatives thereof.

The most important diphenols are bisphenol A, tetramethyl bisphenol A, 1,1-bis-(4-hydroxyphenyl)-isobutane, 1,1-bis-(4-hydroxyphenyl)-cyclohexane, 4,4'-dihydroxydiphenyl sulfide, 4,4'-dihydroxydiphenyl sulfone and di- and tetrahalogenated derivatives thereof. Bisphenol A is particularly preferred. Mixtures of the diphenols mentioned may also be used.

Suitable branching agents are mentioned in DE-OS 2 940 024 and 3 007 934.

Preferred chain terminators for the aromatic polyester carbonates C.4 are phenol, $C_{1-12}$ alkylphenols, halogenated phenols, hydroxydiphenyl, naphthols, chlorocarbonic acid esters of these phenols and chlorides of aromatic monocarboxylic acids optionally substituted by $C_{1-22}$ alkyl groups and/or halogen and the chlorides of aliphatic monocarboxylic acids containing up to 22 carbon atoms, these chain terminators being used in quantities of from 0.1 to 10 mol % (based on diphenols in the case of phenols and on dicarboxylic acids in the case of acid chlorides).

In the aromatic polyester carbonates C.4, up to 30 mol-% and preferably from 0 to 20 mol-% of the aromatic dicarboxylic acids and aromatic dihydroxy compounds may be replaced by corresponding aliphatic compounds, for example adipic acid, 1,4-butanediol.

The aromatic polyester carbonates C.4 may also contain co-condensed aromatic hydroxycarboxylic acids, such as p-hydroxybenzoic acid. The content of the hydroxycarboxylic acids may be up to 100 mol-% and is preferably from 30 to 50 mol-% (based on dihydroxy compound).

The aromatic polyester carbonates C.4 may contain from 1 to 99% by weight and preferably from 25 to 75% by weight terephthalic acid and from 99 to 1% by weight and preferably from 75 to 25% by weight isophthalic acid residues.

The aromatic polyester carbonates C.4 may contain from 1 to 99 mol-% and more especially from 30 to 80 mol-% ester groups, based on the sum of ester and carbonate groups.

Ester and carbonate groups may be arranged in blocks or in statistical distribution in the aromatic polyester carbonates C.4.

The production of the aromatic polyester carbonates C.4 is known and is described, for example, in DE-OS 1 495 626, 3 232 877, 2 703 376, 3 000 610, 2 714 544, 2 940 024 and 3 007 934 and in U.S. Pat. No. 3,169,121.

The aromatic polyester carbonates C.4 have relative solution viscosities ηrel of from 1.18 to 1.4 and preferably from 1.22 to 1.3 (as measured on 0.5 g polyester carbonate, dissolved in 100 ml $CH_2Cl_2$ at 25° C.).

Another thermoplastic resin C according to the invention is a mixture of 5 to 95% by weight and preferably 50 to 90% by weight polyester carbonate C.4 and 95 to 5% by weight and preferably 10 to 50% by weight polycarbonate C.3.

Aromatic polyether sulfones C.5 are preferably linear thermoplastic polyarylene polyether sulfones in which the aryl units are attached by ether and sulfone groups. They are obtained by reaction of an alkali metal double salt of a dihydric phenol (bisphenol) with a benzoid compound containing at least two halogen atoms, at least one of the two reactants having to contain a sulfone group ($SO_2$). Polyether sulfones and their production are known (cf U.S. Pat. No. 3,264,536, GB-PS 1,264,900, EPA 0 038 028).

The polyether sulfones C.5 contain recurring units corresponding to formula (VIII)

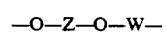 (VIII)

in which
Z is the residue of a dihydric phenol and
W is the residue of a benzoid compound containing an inert electron-attracting group
and in which Z and W may be attached to the oxygen atoms by aromatic carbon atoms via valence bonds and at least one of the residues Z and W contains a sulfone group between aromatic carbon atoms.

Preferred diphenols for the production of the aromatic polyether sulfones C.5 are the compounds corresponding to formula (III) and, more preferably, the compounds corresponding to formula (X).

Preferred benzoic compounds containing at least two halogen atoms are binuclear compounds corresponding to formula (XI)

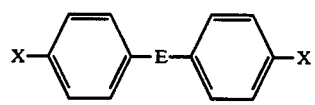 (XI)

in which X is halogen (F, Cl, Br, I) and E represents difunctional electron-attracting groups, such as sulfone, carbonyl, vinyl, sulfoxide or azo groups. Each of the two benzene rings may be substituted by one or more saturated hydrocarbon radicals or electron-attracting groups.

Preferred aromatic dihalogen compounds (XI) are 4,4'-dichlorodiphenyl sulfone and 4,4'-dichlorobenzophenone.

The aromatic polyether sulfones C.5 may also be branched. Suitable branching agents are those normally used for the production of aromatic polyesters (DE-OS 2 940 024) and for the production of aromatic polyester carbonates (DE-OS 3 007 934).

Preferred chain terminators for the production of the aromatic polyether sulfones C.5 are phenol, alkylphenols containing $C_{1-12}$ alkyl groups and halogenated phenols and also bromides and chlorides of $C_{1-10}$ alkanes, being used in quantities of from 0.1 to 10 mol-% (based on diphenols in the case of phenols and on the aromatic dihalogen compounds in the case of chlorides).

The aromatic polyether sulfones C.5 have reduced viscosities ($\eta$red) in the range from 0.15 to 1.5 dl/g and preferably in the range from 0.35 to 0.65 dl/g (as measured on solutions of 20 mg polyether sulfone in 10 ml $CHCl_3$ at 25° C.).

The thermoplastic molding compositions according to the invention may contain other known additives for aromatic polycarbonates A, graft polymers B or thermoplastic resins C, such as stabilizers, pigments, mold release agents, flameproofing agents and antistatic agents, in the usual quantities.

The thermoplastic molding compositions according to the invention may be prepared by mixing the constituents in known manner and melt-compounding or melt-extruding the resulting mixtures at elevated temperatures, preferably at 200° to 350° C., in standard machines, such as internal kneaders, extruders or twin-screw extruders.

The constituents may be mixed successively or simultaneously.

Accordingly, the present invention relates to a process for the production of the thermoplastic molding compositions according to the invention by mixing of the components at elevated temperature. These compositions may be used for the production of moldings of any kind, for example by injection molding. Examples of moldings are housing parts (for example for domestic appliances, such as juice presses, coffee machines, mixers), cover panels for the building industry, automobile parts. In addition, they may be used for electrical equipment, for example for multiway connectors, by virtue of their very good electrical properties. Moldings may also be produced by thermoforming from prefabricated sheets or films.

Accordingly, the present invention relates to the use of the thermoplastic molding compositions for the production of the moldings.

EXAMPLES

Polycarbonate A 1436.4 gram (g) (6.3 mol) bisphenol A (2,2-bis-(4-hydroxy-phenyl)-propane, 2387.0 g (7.7 mol) 1,1-bis-(4-hydroxyphenyl) -3,3,5-trimethyl cyclohexane and 7476.0 g (84 mol) 45% NaOH are dissolved in 33.7 liter (l) water in an inert gas atmosphere. A solution of 36.9 g (0.392 mol) phenol in 11 l methylene chloride and 13 l chlorobenzene is then added. 2772 g (28 mol) phosgene are then introduced into the thoroughly stirred solution at pH 13-14/21°-25° C. 14 milliliter (ml) ethyl piperidine are then added and the mixture is stirred for 45 minutes. The bisphenolate-free aqueous phase is separated off, the organic phase after acidification with phosphoric acid is washed with water until free from electrolyte and the solvent is removed. The polycarbonate obtained has a relative solution viscosity ($\eta$rel) of 1.30 and a glass temperature Tg of 206° C. (DSC).

Graft Polymer B

B. I

Graft polymer of 50 parts by weight of a mixture of styrene and acrylonitrile (ratio by weight 72:28) on 50 parts by weight of a partially crosslinked, coarse-particle polybutadiene having an average particle diameter of 0.38 $\mu$m (d50 value) and a gel content of 89% by weight was prepared according to DE-OS 3 708 913.

Preparation

A mixture of 200 parts by weight of a 50% by weight latex of the polybutadiene and 149 parts by weight water was introduced into a reactor and heated to 60°-62° C. The following mixtures are then introduced into the reactor at that temperature:

1. Mixture (emulsion) of:
   0.0836 part by weight cumene hydroperoxide
   6.9600 parts by weight water
   0.0600 part by weight Na salt of $C_{14-16}$ alkyl sulfonic acids 2. Mixture (solution) of:
   0.0557 part by weight ascorbic acid
   6.9600 parts by weight water The following are then separately introduced into the reactor with stirring at the same time over a period of 4 hours at an internal temperature of 60° to 62° C.:

| Z 1: | 39.05 | parts by weight water |
|---|---|---|
| | 4.00 | parts by weight Na salt of disproportionated abietic acid |
| | 3.10 | parts by weight 1 N sodium hydroxide |
| | 0.62 | part by weight cumene hydroperoxide |
| Z 2: | 72 | parts by weight styrene |
| | 28 | parts by weight acrylonitrile |
| Z 3: | 39.8 | parts by weight water |
| | 0.105 | part by weight ascorbic acid |

Polymerization is then completed over a period of 6 hours to 60° to 62° C. The monomer conversion is more than 97% by weight.

After stabilization with 1.2 parts by weight phenolic antioxidant per 100 parts by weight graft polymer, the graft polymer is precipitated by coagulation with a mixture of acetic acid and magnesium sulfate, washed and dried to form a powder.

The graft yield, i.e. the ratio by weight of graft polymerized styrene and acrylonitrile to the total styrene and acrylonitrile, comprises 89% by weight.

The graft yield was determined by fractional separation in an ultracentrifuge using the separating liquids dimethyl formamide/methyl cyclohexane and by determining the quantities and chemical composition of the fractions thus obtained (cf. R. Kuhn, Makromol. Chemie 177, 1525 (1976)).

B.II

Graft polymer of 50 parts by weight of a mixture of styrene and acrylonitrile (in a ratio by weight of 72:28) on polybutadiene, mean particle diameter 0.1 $\mu$m (d50 value) (prepared in the same way as B.1).

Thermoplastic Resin C

C.1 Vinyl Copolymers

C.1.1

Styrene/maleic anhydride copolymer containing 8% maleic anhydride (Dylark 232, a product of Arco Polymers Inc.), L value 1.7 g/10 mins., number average molecular weight 135,000 g/mol.

C.1.2

Styrene/acrylonitrile copolymer (ratio of styrene to acrylonitrile 72:28), intrinsic viscosity $\eta$ 0.55 dl/g (as measured in dimethyl formamide at 20° C.).

C.2 Polyalkylene Terephthalate

Linear polyethylene terephthalate, intrinsic viscosity (I.V.)=0.85 dl/g, as measured in phenol/o-dichlorobenzene (1:1) at 25° C. and at a concentration of 0.5 g/dl.

C.3 Aromatic Polycarbonate

Linear polycarbonate based on bisphenol a, relative solution viscosity $\eta rel$ 1.26 to 1.28, as measured in $CH_2Cl_2$ at 25° C. and at a concentration of 0.5 g/ml.

C.4 Aromatic Polyester Carbonates

Polyester carbonate, ester content 50 mol-%, based on bisphenol A, isophthalic and terephthalic acid (1:1) containing 3 mol-%, based on bisphenol A units, p-isooctyl phenyl terminal groups, relative solution viscosity of 1.30 (as measured on a solution of 0.5 g polyester carbonate in 100 ml $CH_2Cl_2$ at 25° C.).

C.5 Aromatic Polyether Sulfone 1141.7 Parts bis-2,2-(4-hydroxyphenyl)-propane and 1435.8 parts by weight bis-(4-chlorophenyl)-sulfone are dissolved under nitrogen in 4500 parts by weight N-methyl pyrrolidone and 970 parts by weight chlorobenzene and 760 parts by weight anhydrous potassium carbonate are added to the resulting solution. The reaction mixture is heated for 30 minutes to 180° C. and kept at that temperature for 5 hours, a mixture of water and chlorobenzene distilling off. The chlorobenzene is distilled off over a period of another 4 hours. After a reaction time of 6 hours, the reaction mixture is cooled to 60°-70° C., the polyer is precipitated in methanol, washed with water and dried in vacuo. The product has a reduced viscosity of 0.52 dl/g ($CHCl_3$ at 25° C.).

Production and Testing of the Molding Composition According to the Invention Polycarbonate A, graft polymer B and, optionally, thermoplastic resin C are melted and homogenized at temperatures between 250° and 320° C. in a 1.3 liter internal kneader.

Test specimens measuring 80×10×4 mm were made from the molding composition in an injection molding machine (processing temperature 280° C.) and were used to determine notched impact strength (by the ISO 180 method) at room temperature.

Stress crazing behavior (ESC) behavior) was determined on 80×10×4 mm test specimens, melt temperature 280° C., in accordance with DIN 53 449/3. A mixture of 50% toluene and 50% isooctane was used as simulated fuel. The test specimens were pre-extended by means of a circular arch shaped template and stored in the simulated fuel for 5 minutes (or 10 minutes) at 23° C. The pre-extension $\epsilon x$ was 0.4 to 2.0%. Stress behavior was evaluated on the basis of crazing or failure as a function of the pre-extension.

As can be seen from Table 1, Examples 2 to 5 according to the invention show a 2 to 3 times higher notched impact strength level than Comparison Example I. This effect is much more pronounced in relation to the starting level than in the case of the known bisphenol A polycarbonate.

In addition, it was surprisingly found that mixtures of the polycarbonate A with the graft polymer B.II (mean particle diameter 0.1 μm) show considerably improved ESC behavior (Examples 4–5).

The molding compositions according to the invention retain their high notched impact strengths even when other thermoplastics (component C) are incorporated (Tables 2 to 4).

TABLE 1

Molding compounds of binary mixtures of components A and B

| Example | Components [% by weight] A | B.I | B.II | Notched impact strength ak at RT [kJ/m²] | ESC behavior failure at ex [%] |
|---|---|---|---|---|---|
| 1 (Comp.) | 100 | — | — | 10 | 0.4 |
| 2 | 80 | 20 | — | 25 | 0.4 |
| 3 | 70 | 30 | — | 30 | 0.4 |
| 4 | 80 | — | 20 | 27 | 0.6 |
| 5 | 70 | — | 30 | 28 | 2.4 |

TABLE 2

Molding compositions of ternary mixtures of components A, B and C

| Example | A | B.II | C.1.1 | C.1.2 | C.2 | C.4 | C.5 | Notched impact strength $a_k$ at RT [kJ/m²] |
|---|---|---|---|---|---|---|---|---|
| 6 | 50 | 30 | 20 | — | — | — | — | 29 |
| 7 | 50 | 30 | — | 20 | — | — | — | 38 |
| 8 | 50 | 30 | — | — | 20 | — | — | 36 |
| 9 | 50 | 30 | — | — | — | 20 | — | 30 |
| 10 | 50 | 30 | — | — | — | — | 20 | 20 |

TABLE 3

Molding compositions of ternary mixtures of components A, B and with bisphenol A polycarbonate as component C

| Example | A | B.II | C.3 | Notched impact strength ak at RT [kJ/m²] |
|---|---|---|---|---|
| 11 | 20 | 20 | 60 | 45 |
| 12 | 40 | 20 | 40 | 41 |
| 13 | 60 | 20 | 20 | 35 |

TABLE 4

Molding compositions containing two different components C

| Example | A | B.I | C.3 | C.1.2 | Notched impact strength $a_k$ at RT [kJ/m²] |
|---|---|---|---|---|---|
| 14 | 5 | 24 | 55 | 16 | 35 |
| 15 | 10 | 24 | 50 | 16 | 35 |
| 16 | 20 | 24 | 40 | 16 | 32 |

What is claimed is:

1. A thermoplastic molding composition comprising
(A) 5 to 99% by weight, based on the total of components (A) and (B), of a polycarbonate containing structural units corresponding to the formula

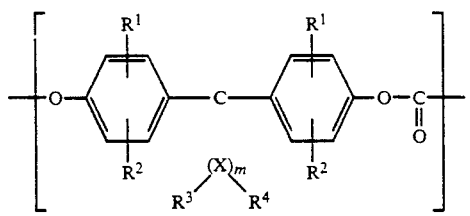

in which
R$^1$ and R$^2$ independently of one another represent a member selected from the group consisting of hydrogen, halogen, C$_{1-8}$ alkyl, C$_5$–C$_6$ cycloalkyl, C$_{6-10}$ aryl, and C$_{7-12}$ aralkyl,
m is an integer of 4 to 7,
R$^3$ and R$^4$ are individually selected for each X and independently of one another represent hydrogen or C$_{1-6}$ alkyl,
X represents carbon, with the proviso that, for at least one X atom, R$^3$ and R$^4$ are both alkyl;
(B) 1 to 95% by weight, based on the total of components (A) and (B), of a graft polymer of
(B.1) 5 to 90 percent by weight of a mixture of i), ii), or iii)
  i) (B.1.1) 50 to 95 parts by weight of at least one member selected from the group consisting of styrene, a-methyl styrene, C$_{1-4}$ alkyl- or halogen-nucleus-substituted styrene, and
    (B.1.2) 5 to 50 parts by weight of at least one member selected from the group consisting of acrylonitrile, methacrylonitrile, C$_{1-8}$ alkylmethacrylate, C$_{1-8}$ alkyl acrylate, maleic anhydride, C$_{1-4}$ alkyl-N-maleic imide, and phenyl-N-maleic imide,
  ii) (B.1.1) 50 to 95 parts by weight of at least one member selected from the group consisting of styrene, a-methyl styrene, C$_{1-4}$ alkyl- or halogen-nucleus-substituted styrene, C$_{1-8}$ alkyl methacrylate, and C$_{1-8}$ alkyl acrylate, and
    (B.1.2) 5 to 50 parts by weight of at least one member selected from the group consisting of acrylonitrile, methacrylonitrile, maleic anhydride, C$_{1-4}$ alkyl-N-maleic imide, and phenyl-N-maleic imide,
  iii) 100 parts by weight of at least one of C$_{1-8}$ alkyl methacrylates and C$_{1-8}$ alkyl acrylates grafted on
(B.2) 10 to 95 parts by weight of a diene rubber having an average particle diameter d$_{50}$ of from 0.09 to 1 μm and a gel content of more than 50% by weight, an initiator system including an organic hydroperoxide and ascorbic acid having been used during graft polymerization, and
(C) optionally, at least one other thermoplastic resin which replaces up to 75% by weight of the polycarbonate (A).

2. The molding composition of claim 1 in which said B has been prepared by polymerization of the monomers B.1 in aqueous emulsion in the presence of an emulsion of the rubber B.2 at temperatures in the range from 40° C. to 70° C. using 0.3 to 1.5 parts by weight hydroperoxide and 0.1 to 1 part by weight ascorbic acid, based on 100 parts by weight monomers B.1, as initiator, the ratio by weight of hydroperoxide to ascorbic acid being from 0.3 to 15.

3. The molding composition of claim 1 in which the thermoplastic resin C is a vinyl copolymer of 50 to 98 parts by weight of at least one member selected from the group consisting of styrene, a-methyl styrene, nucleus-substituted styrenes and 50 to 2 parts by weight of at least one member selected from the group consisting of acrylonitrile, methacrylonitrile, methyl methacrylate, maleic anhydride and N-substituted maleic imides,
C is a vinyl copolymer of 50 to 98 parts by weight of at least one member selected from the group consisting of styrene, a methyl styrene, nucleus-substituted styrenes, methyl methacrylate and 50 to 2 parts by weight of at least one member selected from the group consisting of acrylonitrile, methacrylonitrile, maleic anhydride and N-substituted maleic imides.

4. The molding composition of claim 1 in which the thermoplastic resin C is a polyalkylene terephthalate based on aromatic dicarboxylic acids and aliphatic, cycloaliphatic or aryl aliphatic diols.

5. The molding composition of claim 1, in which the thermoplastic resin C is an aromatic polycarbonate different from A.

6. The molding composition of claim 1 in which the thermoplastic resin C is a polyester carbonate based on C$_{6-30}$ diphenols, aromatic C$_{8-14}$ dicarboxylic acids, and carbonic acid derivatives.

7. The molding composition of claim 1 in which the thermoplastic resin C is an aromatic polyether sulfone containing recurring units corresponding to the formula

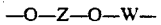

in which
Z is the residue of a dihydric phenol and
W is the residue of a benzoid compound containing an inert, electron-withdrawing group
and in which Z and W are attached at aromatic carbon atoms to the oxygen atoms via valence bonds and at least one of Z or W contains a sulfone group between aromatic carbon atoms.

8. The composition of claim 1 wherein said styrene is nucleus-substituted by C$_{1-4}$ alkyl or halogen.

* * * * *

UNITED STATES PATENT AND TRADEMARK OFFICE
CERTIFICATE OF CORRECTION

PATENT NO. : 5,126,404

DATED : June 30, 1992

INVENTOR(S) : Thomas Eckel et al

It is certified that error appears in the above-identified patent and that said Letters Patent is hereby corrected as shown below:

Title page, Item [75] after "Inventors:", delete "Eckel Thomas" and insert --Thomas Eckel--.
Item [19] delete, "Eckel Thomas et al should read --Thomas Eckel etal--.
In the Abstract, at line 7, before "5 to 90 parts by weight of a mixture of", insert --B.1.--.

In the Abstract, at line 20, before "optionally at least one", insert --C.--.

At column 2, line 25, delete formula (I) and insert the following therefor:

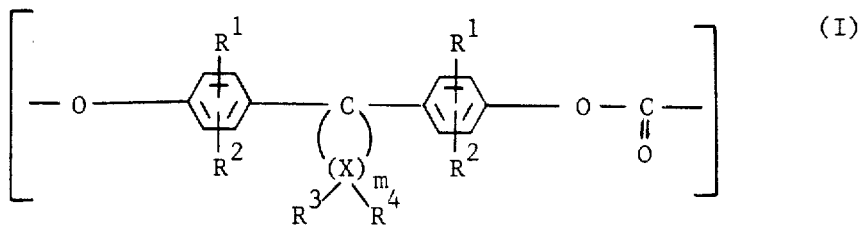

UNITED STATES PATENT AND TRADEMARK OFFICE
CERTIFICATE OF CORRECTION

PATENT NO. : 5,126,404

DATED : June 30, 1992

INVENTOR(S) : Thomas Eckel et al

It is certified that error appears in the above-identified patent and that said Letters Patent is hereby corrected as shown below:

At column 2, line 50, delete formula (II) and insert the following therefor:

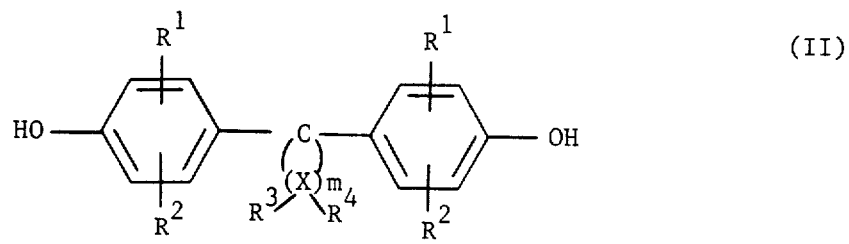

UNITED STATES PATENT AND TRADEMARK OFFICE
CERTIFICATE OF CORRECTION

PATENT NO. : 5,126,404
DATED : June 30, 1992
INVENTOR(S) : Thomas Eckel et al

It is certified that error appears in the above-indentified patent and that said Letters Patent is hereby corrected as shown below:

In Claim 1, at column 17, delete the formula, and insert the following therefor:

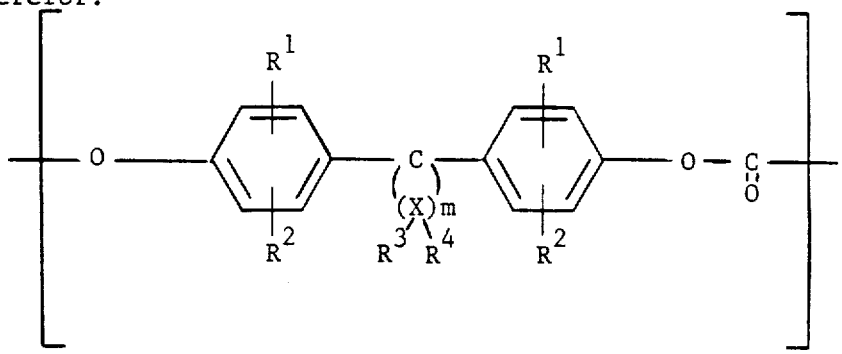

Signed and Sealed this

Twenty-sixth Day of October, 1993

*Attest:*

BRUCE LEHMAN

*Attesting Officer*   *Commissioner of Patents and Trademarks*